(12) United States Patent
Alonso et al.

(10) Patent No.: US 7,412,383 B1
(45) Date of Patent: Aug. 12, 2008

(54) REDUCING TIME FOR ANNOTATING SPEECH DATA TO DEVELOP A DIALOG APPLICATION

(75) Inventors: Tirso M. Alonso, New Providence, NJ (US); Ilana Bromberg, Murray Hill, NJ (US); Dilek Z. Hakkani-Tur, Morris Plains, NJ (US); Barbara B. Hollister, Mountainside, NJ (US); Mazin G. Rahim, Warren, NJ (US); Giuseppe Riccardi, Hoboken, NJ (US); Lawrence Lyon Rose, Basking Ridge, NJ (US); Daniel Leon Stern, Princeton, NJ (US); Gokhan Tur, Morris Plains, NJ (US); James M. Wilson, Berkeley Heights, NJ (US)

(73) Assignee: AT&T Corp, New York, NY (US)

( * ) Notice: Subject to any disclaimer, the term of this patent is extended or adjusted under 35 U.S.C. 154(b) by 1213 days.

(21) Appl. No.: 10/407,965

(22) Filed: Apr. 4, 2003

(51) Int. Cl.
*G10L 15/06* (2006.01)
*G10L 15/22* (2006.01)

(52) U.S. Cl. .................. 704/236; 704/243; 704/257

(58) Field of Classification Search .......... 704/231, 704/236, 238, 243, 244, 245, 255, 257
See application file for complete search history.

(56) References Cited

U.S. PATENT DOCUMENTS

| | | | |
|---|---|---|---|
| 6,219,643 B1 * | 4/2001 | Cohen et al. | 704/257 |
| 7,035,790 B2 * | 4/2006 | Rajan | 704/201 |
| 7,054,812 B2 * | 5/2006 | Charlesworth et al. | 704/251 |
| 7,092,888 B1 * | 8/2006 | McCarthy et al. | 704/277 |
| 7,149,687 B1 * | 12/2006 | Gorin et al. | 704/243 |
| 7,152,029 B2 * | 12/2006 | Alshawi et al. | 704/1 |
| 7,191,119 B2 * | 3/2007 | Epstein et al. | 704/10 |
| 7,263,486 B1 * | 8/2007 | Hakkani-Tur et al. | 704/243 |
| 7,292,976 B1 * | 11/2007 | Hakkani-Tur et al. | 704/236 |
| 2004/0204940 A1 * | 10/2004 | Alshawi et al. | 704/240 |

OTHER PUBLICATIONS

Tur et al., "Active learning for spoken language understanding," 2003 IEEE International Conference on Acoustics, Speech, and Signal Processing, 2003 (ICASSP '03), Apr. 6-10, 2003, vol. 1, pp. I-276 to I-279.*

Tur, G. "Multitask Learning for Spoken Language Understanding", 2006 IEEE International Conference on Acoustics, Speech and Signal Processing, 2006. ICASSP 2006 Proceedings., May 14-19, 2006, vol. 1, pp. I-585 to I-588.*

Rochery et al., "Combining prior knowledge and boosting for call classification in spoken language dialogue," IEEE International Conference on Acoustics, Speech, and Signal Processing, 2002. Proceedings. (ICASSP '02) May 13-17, 2002, vol. 1, pp. I-29 to I-32.*

* cited by examiner

*Primary Examiner*—Martin Lerner

(57) ABSTRACT

Systems and methods for annotating speech data. The present invention reduces the time required to annotate speech data by selecting utterances for annotation that will be of greatest benefit. A selection module uses speech models, including speech recognition models and spoken language understanding models, to identify utterances that should be annotated based on criteria such as confidence scores generated by the models. These utterances are placed in an annotation list along with a type of annotation to be performed for the utterances and an order in which the annotation should proceed. The utterances in the annotation list can be annotated for speech recognition purposes, spoken language understanding purposes, labeling purposes, etc. The selection module can also select utterances for annotation based on previously annotated speech data and deficiencies in the various models.

21 Claims, 2 Drawing Sheets

REDUCING TIME FOR ANNOTATING SPEECH DATA TO DEVELOP A DIALOG APPLICATION

BACKGROUND OF THE INVENTION

1. The Field of the Invention

The present invention relates to systems and methods for annotating speech data. More particularly, the present invention relates to systems and methods for reducing the time required to annotate speech data.

2. The Relevant Technology

A dialog application is an application that is able to receive speech input, recognize the speech input, interpret the speech input, and generate a response to the speech input. Many companies use dialog applications to receive and respond to customer inquiries regarding bill payments, order status, complaints, etc. While a dialog application can reduce the costs associated with receiving and responding to customer inquiries, the development of a dialog application is an arduous task that requires considerable time to complete.

One of the tasks in developing a dialog application is to annotate the speech data that is used to build and train the automatic speech recognition system and the spoken language understanding system. Annotating the speech data for purposes of speech recognition involves, for example, identifying the phonemes that are included in each utterance of the speech data. Annotating the speech data for purposes of spoken language understanding involves using an annotation guide to assign a call type to each utterance in the speech data. Annotating the speech data is a time-consuming task because tens or hundreds of thousands of utterances are usually required to build and train the speech recognition models and the spoken language understanding models of the dialog application and it often takes fifty minutes to annotate one minute of speech data.

The amount of annotation that can be done on a particular day is limited by the number of people that are available to annotate the utterances or speech files included in the speech data. Currently, the annotation to be performed for a particular day is selected using a random selection process. Random selection is very general and does not address the deficiencies of the dialog application. The inability to quickly annotate the speech data has an impact on the development of the dialog system.

BRIEF SUMMARY OF THE INVENTION

These and other limitations are overcome by the present invention, which relates to systems and methods for annotating speech data and more particularly to systems and methods for reducing the time required to annotate speech data. In a dialog application, speech data is used for various purposes including training the automatic speech recognition models and the spoken language understanding models. Before the speech data can be used to build or train various models of a dialog application, the speech data is annotated. The annotation performed for the automatic speech recognition models, however, is different from the annotation performed for the spoken language understanding models.

As a dialog application is being developed, the dialog application may have deficiencies in certain areas. The automatic speech recognition models, for instance, may have trouble recognizing certain utterances. In one embodiment of the present invention, a speech data selection model is able to reduce the annotation time of the dialog application by selecting speech data for annotation that benefits the dialog application.

For example, the speech data selection module may analyze the speech data and select utterances that cannot be recognized. These utterances are then placed in an annotation list. The utterances on the annotation list have priority over other utterances because the annotation of the utterances on the annotation list have been selected for the benefit of the dialog application. Similarly, the speech data selection module can also select utterances that need to be annotated to benefit the spoken language understanding models.

In one embodiment, the speech selection model analyzes the unannotated speech data to produce an annotation list. The annotation list includes a list of speech files or utterances, the type of annotation to be performed for the speech files or utterances on the list, and the order in which the speech files or utterances should be annotated. The speech selection module can also reduce the time required to annotate the speech data by selecting speech data by considering previously annotated speech data and/or system deficiencies.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to systems and methods for reducing the time required to annotate speech data. The time required to annotate the speech data is reduced by identifying the utterances or portion of the speech data that should be annotated next. In one embodiment, the selection of speech data that addresses deficiencies in a dialog application reduces the amount of speech data that needs to be annotated or labeled in order to achieve a given speech recognition or spoken language performance.

Annotating speech data, as used herein, refers to preparing speech data to train automatic speech recognition models, preparing speech data to train spoken language understanding models, labeling speech data, and classifying or assigning a call type to the utterances in the speech data, and the like. One of skill in the art can appreciate that the annotation required to prepare speech data for training automatic speech recognition models is different from the annotation required to prepare speech data for training spoken language understanding models.

In one embodiment, the present invention identifies the annotation work that should be performed. The present invention identifies one or more lists of speech files (each speech file often corresponds to an utterance), the type of annotation work required for each list of speech files, and the order in which the speech files should be annotated. The present invention can select the speech data to be annotated from all of the speech data that is currently available to the system and can also identify the speech data to be annotated based on system needs or deficiencies. The speech data annotated during a particular day may be used to identify and optimize the annotation lists that are generated for the following day.

One embodiment of the present invention ensures that the annotation work performed during the day is focused on improving the system and on addressing system deficiencies. One advantage of the present invention is that the automatic speech recognition models and the spoken language understanding models can be derived from less annotated speech data than would be required if traditional approaches to selecting the speech data for annotation were used. This can result in a cost savings because the dialog application can be developed more quickly. Although the present invention is described in terms of a dialog application, one of skill in the art can appreciate that the systems and methods described herein can be used to annotate speech data, develop speech recognition systems, develop spoken language understanding systems, and the like.

Figure 1:
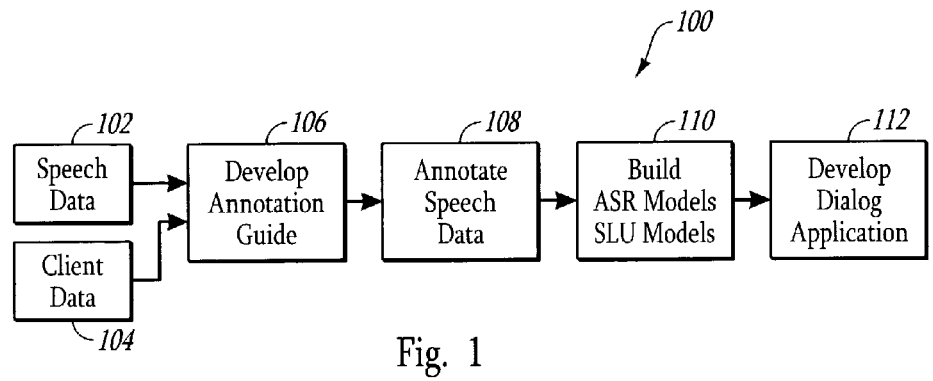
FIG. 1 illustrates an exemplary method for developing a dialog application by annotating speech data.

FIG. 1 is a block diagram that illustrates an example of how a dialog application is developed. The speech data 102 is first collected and, in one embodiment, is a collection of audio files or digitized utterances. A transcription of each audio file or utterance may also be included in the speech data 102. In one embodiment, the development of the annotation guide 106 and the annotation of the speech data 108 can occur concurrently with the collection of the speech data 102 and the client data 104.

The client data 104 represents the data that is required to help a user experience person develop an annotation guide 106. The client data 104 can include the purposes and goals of the dialog application as well as embody an understanding of the client's business. With an understanding of the client data 104, a user experience person is able to develop an annotation guide (106) that is used to annotate the speech data 102 for purposes of the spoken language understanding models. The annotation guide defines call types that are used to classify the utterances or speech files in the speech data 102. After the annotation guide is developed, the speech data is annotated or labeled 108 by labelers. As previously mentioned, annotating the speech data can consume a large amount of time.

As previously mentioned, annotating speech data can have different applications according to the task being performed. The annotation of the speech data for the spoken language understanding models indicates, for example, that each utterance or speech file is being classified as being of at least one call type. Speech data annotated using call types is often used as training data that enables the spoken language understanding models to determine the semantic meaning of the speech files or of speech received into the dialog application.

Annotating the data for the automatic speech recognition models, including acoustic models and language models, refers to identifying the phonemes or sequence of phonemes that are included in the utterance. Annotating the speech data for the automatic, speech recognition models is performed such that the automatic speech recognition models can convert speech input into a text string that can be interpreted, for example, by the spoken language models.

As the speech data is being annotated (108), the automatic speech recognition models and the spoken language understanding models are built for the dialog application (110). The models are often developed concurrently with the annotation of the speech data and the annotated speech data can be used to begin training the models even if the speech data is not fully annotated. As more speech data is annotated, the annotated speech data is added to the training data. Finally, the dialog application 112 is finished and constructed using the automatic speech recognition models, the spoken language understanding models, and the annotated data 108.

The present invention can be used in automatic speech recognition, spoken language understanding, labeling, etc. In automatic speech recognition, a speech recognizer takes audio input and typically produces text as output. The automatic speech recognition typically uses two different types of trained models: an acoustic model and a language model. The acoustic model breaks the speech wave form into a sequence of phonemes or other similar components. The language model organizes the phonemes into words. To train a language model, a person listens to an audio file and produces a transcription of that file. The transcription is added to the training data that is used to train a language model. The combination of the original audio file and the transcription are added to the training data that is used to train an acoustic model.

After the utterances or speech files in the speech data are recognized by the automatic speech recognition system and transformed into text, it is necessary to determine the semantic meaning of the utterances. In other words, it is necessary to know what the caller or speaker said in order to determine how to respond. In most dialog applications, the annotation guide describes a relatively large number of different call types. Each call type describes a different type of call. For example, an ask call type may identify utterances that refer to a person who is asking for information. A cancel call type, on the other hand, may refer to a person who is attempting to cancel their service. The call types and annotation guide help labelers annotate the speech data more effectively for purposes of the dialog application and for training the spoken language understanding models.

One embodiment of the present invention is an automated process that automatically determines the speech data that should be annotated based in part on the speech data that has already been annotated. The present invention can identify speech files for annotation while the labelers are annotating the speech data or the present invention can generate an annotation list during the night that is to be annotated by the labelers during the next day, for example.

The speech files or utterances selected for annotation are often selected based on deficiencies and shortcomings of the dialog application. For example, if the automatic speech recognition models are having difficulty recognizing a particular utterance, then speech files that are similar to the particular utterance may be selected for annotation. This strengthens the dialog application without having the labelers annotate speech data that the dialog application can readily recognize or interpret. By identifying the speech data that is most useful to annotate, the dialog application can be developed more quickly and in less time.

Figure 2:
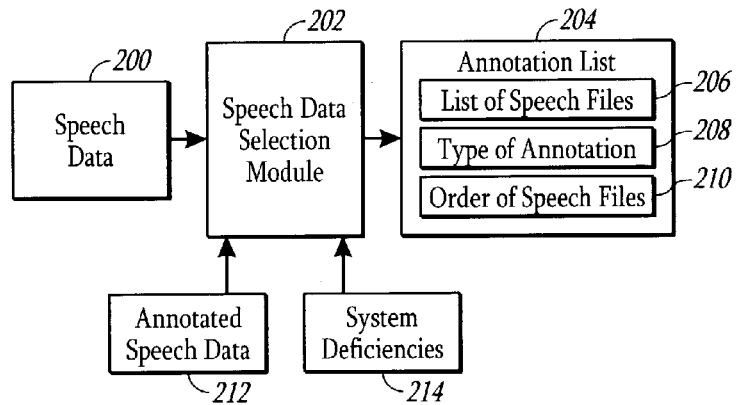
FIG. 2 is a block diagram that illustrates a speech data selection module that generates an annotation list that includes speech files for annotation.

FIG. 2 illustrates one embodiment of a method for reducing the annotation time required for a corpus of speech data. In FIG. 2, the speech data selection module 202 analyzes the speech data 200 and generates an annotation list 204 that contains the speech data to be annotated. As previously stated, the annotation of the speech data in the annotation list 204 provides more benefit to a system than when speech data is randomly selected and annotated. In this example, the annotation list 204 includes one or more lists of speech files 206 (or utterances) selected from the speech data 200, the type of annotation 208 to be performed for each list or each speech file, and the order in which the speech files 210 should be annotated.

For example, the speech data selection module 202 may produce a list of speech files that should to be annotated for automatic speech recognition models. The speech data selection module 202 may also produce a list of speech files that should be annotated for spoken language understanding purposes. In another example, the speech data selection module 202 may produce a list of speech files that should be annotated for labeling purposes.

In one embodiment, the speech data selection module 202 also selects speech files for annotation based on the previously annotated speech data 212 and/or system deficiencies 214. By using the previously annotated speech data 212 and/or system deficiencies 214, the speech data selection module 202 can help a dialog application be developed more rapidly using less annotated speech data. This reduces the time necessary to generate the dialog application and reduces the time required to annotate the speech data.

Figure 3:
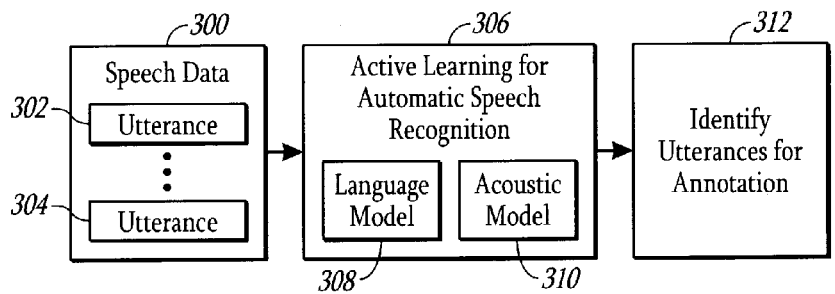
FIG. 3 is an exemplary process for identifying speech files that are to be annotated for automatic speech recognition purposes.
Figure 4:
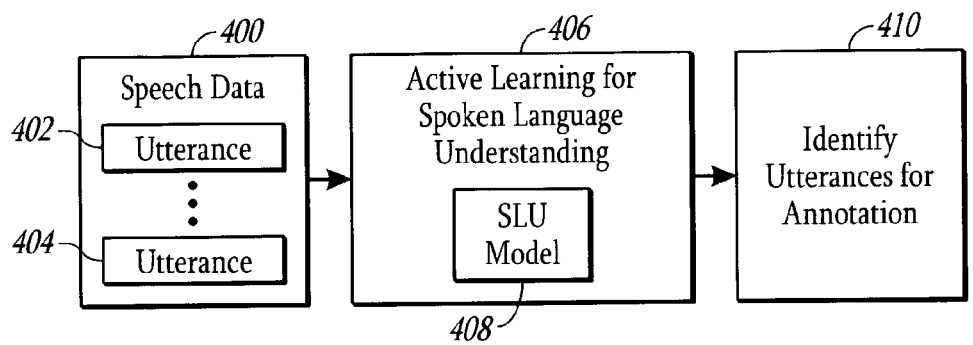
FIG. 4 is an exemplary process for identifying speech files that are to be annotated for spoken language understanding purposes.
Figure 5:
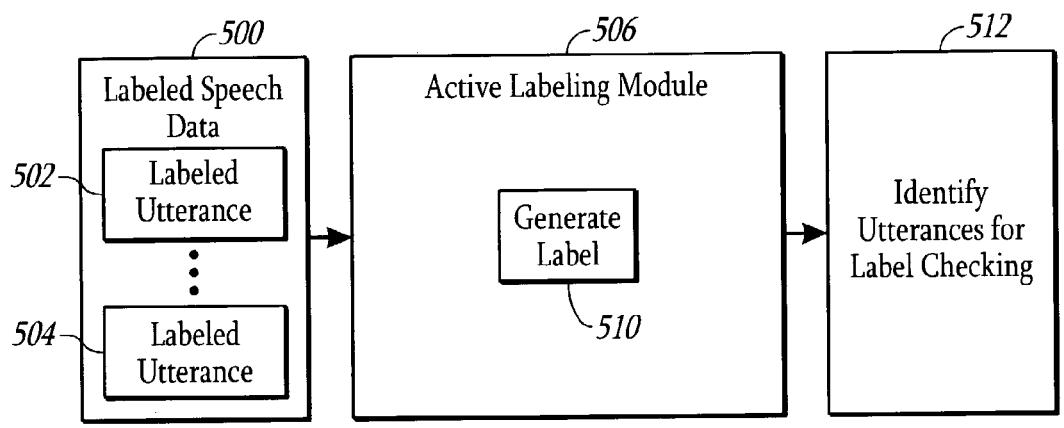
FIG. 5 is an exemplary process for identifying speech files whose existing labeling and classification should be reviewed.

FIGS. 3, 4 and 5 illustrate examples of reducing annotation time by identifying speech files to be annotated for speech recognition purposes, spoken language understanding purposes, and labeling purposes. In these examples, the speech files that are selected for annotation are selected using a confidence score. Speech files or utterances that do not meet a predetermined threshold confidence score are typically included in the list. One of skill in the art can appreciate that speech files can be identified or selected using other criteria. The criteria used to select speech files or utterances may include, but are not limited to, word distance measurements, likelihoods, confidence scores, clusters, and the like or any combination thereof. The criteria used to select speech files or utterances may also include dialog contexts. For example, a dialog application often asks if the previous statement of the customer was understood correctly. If the customer responds that the previous statement was not understood, then the previous statement is an example of an utterance that is identified for annotation. Thus, the annotation list can include utterances where the criteria used to identify the utterances included a dialog context where the customer was not properly understood. Other criteria may include dialog contexts where the customer hangs up because he or she was not understood. The energy or other features of the utterances may also be used as criteria to identify utterances that are included in the annotation list. In addition, the present invention does not require that the entire speech corpus be processed in order to identify utterances or speech files that should be annotated.

The criteria used to identify utterances that should be annotated for speech recognition purposes can be different from the criteria used to identify utterances for spoken language understanding purposes or labeling purposes. In addition, more than one type of criteria can be used for each type of annotation to be performed.

FIG. 3 illustrates an example of reducing annotation time by identifying speech files to be annotated for the automatic speech recognition models. The speech data 300, as previously indicated, includes a plurality of speech files that are represented as the utterance 302 and the utterance 304. The speech files or utterances in the speech data 300 are evaluated or analyzed using a criterion that reflects how well the utterance was recognized by the automatic speech recognition models or that reflects whether the utterances can be recognized by the speech recognition models. The utterances that do not satisfy the criterion are identified as utterances that should be annotated for speech recognition purposes. In one embodiment, the utterances that are furthest from satisfying the criterion are identified and selected for annotation before other utterances that are closer to satisfying the criterion.

As previously stated, it is not necessary to evaluate the entire corpus of speech data. Thus processing or analyzing the speech data includes processing or analyzing a portion of the speech data. The identification of utterances for annotation can cease, for example, when the annotation list includes more utterances than can be annotated the next day. Alternatively, additional utterances can be identified by clustering the speech data using utterances that have already been included in the annotation list. This permits the annotation list to include utterances that were not directly evaluated using a particular criteria.

For example, a confidence score may be the criterion used to evaluate the utterances in the speech data 300. In active learning for automatic speech recognition 306, a speech recognizer, which typically includes the automatic speech recognition models (language model 308 and acoustic model 310), attempts to recognize utterances in the speech data 200. Each utterance is assigned a confidence score that reflects how well the utterance was recognized by the automatic speech recognition models. The utterances that have a confidence score that is below a threshold confidence score are identified (312) and included in a list of speech files. This list of files thus includes utterances that are difficult for the automatic speech recognition models to recognize based on the confidence scores.

In some instances, the annotation list may also include speech files or utterances that have not received a confidence score, but are similar to speech files or utterances that have low confidence scores. For example, speech files or utterances can be identified and included in the annotation list, for example, using a clustering technique or a search to find similar utterances in the speech data without having to attempt to recognize each utterance in the speech data.

The selection model, in addition to creating a list of these utterances, which are speech files, also indicates the type of annotation to be performed for the utterances in this list. More specifically, the annotation list indicates that these speech files or utterances should be annotated for purposes of automatic speech recognition. The list optionally indicates which utterances should be annotated first.

By annotating the utterances in the list, the annotated utterances can be added to the training data for the automatic speech recognition models. A deficiency of the automatic speech recognition models is addressed by annotating files that are difficult to recognize. By addressing this deficiency, the data that needs to be annotated to train the speech recognition models is reduced because the utterances selected for annotation provide more benefit than utterances that are selected, for example, randomly from the speech data. Over time, the automatic speech recognition models can be developed more quickly using less annotated data because deficiencies are continually addressed.

FIG. 4 illustrates an example of reducing annotation time by identifying or selecting speech files for annotation for the spoken language understanding module 408 using active learning for spoken language understanding 406. Each speech file or utterance 402, 404 in the speech data 400 is analyzed to determine whether the spoken language understanding module 408 can semantically understand the utterances in the speech data. In one embodiment, the utterances have already been recognized by the automatic speech recognition module although this is not a requirement of the present invention.

The utterances are also each assigned a confidence score that represents how well each utterance was understood by the spoken language understanding model. Those utterances or files that receive a low confidence score are identified in a list for annotation (410). These utterances can be selected to address deficiencies in the spoken language understanding models. As previously indicated, the utterances in the annotation list can be selected using a criterion other than a confidence score.

In another embodiment, utterances can be identified using a search or clustering techniques. For example, if the spoken language understanding model cannot interpret the semantic meaning of a particular utterance, the speech data can be searched or clustered based on that particular utterance. This eliminates the need to test and annotate each utterance individually.

As previously described, manually checking the call types of labels of utterances is a time-consuming task. Checking the call types or labels of the utterances is necessary, however, in order to insure that a dialog application can accurately respond to speech input. Incorrectly labeled utterances may limit the ability of a dialog application to respond appropriately to speech input.

FIG. 5 illustrates an active labeling module 506 used to reduce annotation time be analyzing the existing call types of the speech data. In this example, each labeled utterance 502, 504 in the labeled speech data 500 was labeled with a call type by a labeler. The active labeling module 506 is used to determine if the call type assigned by the labeler is correct. For discussion purposes and from the perspective of the active labeling module 506, the labeled speech data 500 is effectively unannotated in this example until the labeled speech data 500 is processed by the active labeling module 506. The active labeling module 506 can identify utterances that may be labeled incorrectly as well increase the likelihood that other utterances are labeled correctly.

Thus, FIG. 5 illustrates an example of the present invention for reducing annotation time for active labeling. In FIG. 5, the active labeling module 506 accesses labeled speech data 500. The labeled speech data 500 is represented by the labeled utterance 502 and the labeled utterance 504. The labeled speech data 500 was previously labeled with at least one call type, for example, by a labeler using an annotation guide. Thus, each labeled utterance 502, 504 has an existing call type. In this example, the active labeling module 506 receives the labeled utterance 502 and generates a call type or label (510) for the labeled utterance 502.

If the label or call type of the labeled utterance 502 generated by the active labeling module 506 matches the existing label or call type of the labeled utterance 502, then the active labeling module 506 has confidence that the labeled utterance 502 was properly labeled or annotated. If the label or call type generated by the active labeling module 506 does not match the existing label or call type of the labeled utterance 502, then that labeled utterance 502 is identified in a list of utterances (512) and included in the annotation list as a labeled utterance whose label or call type should be checked.

Active labeling also addresses deficiencies in the dialog application and enhances the ability of the active labeling module 506 to better label other utterances that may be present in the speech data. By ensuring that the speech data is labeled correctly, the dialog application is more likely to correctly understand a customer inquiry. Searching and clustering techniques as described above can also be used to identify utterances than are difficult to automatically label or that may have been labeled incorrectly. In other words, clustering and searching techniques can be used to identify utterances that are similar to utterances whose existing labels may be incorrect.

The present invention extends to both methods and systems for annotating speech data and to reducing the time needed to annotate speech data for speech recognition purposes, spoken language understanding purposes, labeling purposes, and the like or any combination thereof. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

This discussion is intended to provide a brief, general description of a suitable computing environment in which the invention may be implemented. Although not required, the invention is described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that uses annotated speech data, a method for annotating speech data, the method comprising:
   processing a portion of unannotated speech data with one or more models, the processing comprising:
   (1) generating a label for a particular utterance; and
   (2) including the particular utterance in the annotation list if the label does not match an existing label of the particular utterance;
   evaluating a performance of the one or more models with respect to each utterance in the portion of unannotated speech data using a criterion; and
   creating an annotation list that includes utterances that do not satisfy the criterion.

2. In a system that uses annotated speech data, a method for annotating speech data, the method comprising:
   processing a portion of unannotated speech data with one or more models;
   evaluating a performance of the one or more models with respect to each utterance in the portion of unannotated speech data using a criterion; and
   creating an annotation list that includes utterances that do not satisfy the criterion by identifying a type of annotation to be performed for utterances in the annotation list; and
   identifying an order in which the utterances on the annotation list are to be annotated.

3. In a system that uses annotated speech data, a method for annotating speech data, the method comprising:
   processing a portion of unannotated speech data with one or more models;
   evaluating a performance of the one or more models with respect to each utterance in the portion of unannotated speech data using a criterion; and
   creating an annotation list that includes utterances that do not satisfy the criterion by
   using system deficiencies in combination with the criterion to identify utterances to be included in the annotation list; and
   using previously annotated speech data in combination with the criterion or the system deficiencies to identify utterances to be included in the annotation list.

4. In a system that uses annotated speech data, a method for annotating speech data, the method comprising:
   processing a portion of unannotated speech data with one or more models;
   evaluating a performance of the one or more models with respect to each utterance in the portion of unannotated speech data using a criterion;
   creating an annotation list that includes utterances that do not satisfy the criterion;
   searching the speech data for additional utterances that are similar to the utterances that do not satisfy the criterion; and
   including the additional utterances in the annotation list.

5. In a system that uses annotated speech data a method for annotating speech data, the method comprising:
   processing a portion of unannotated speech data with one or more models, wherein each utterance in the portion of the speech data is evaluated using a criterion further comprises at least one of:
   (1) assigning each utterance in the portion of the speech data a confidence score, wherein utterances having a confidence score below a threshold confidence score are included in the annotation list;
   (2) evaluating a dialog context of each utterance in the portion of the speech data; and
   (3) evaluating a feature of each utterance in the portion of the speech data;
   evaluating a performance of the one or more models with respect to each utterance in the portion of unannotated speech data using a criterion; and
   creating an annotation list that includes utterances that do not satisfy the criterion.

6. In a system that collects speech data for use in developing a dialog application, a method for annotating the speech data for the dialog application, the method comprising:
   analyzing unannotated speech data with one or more speech recognition models, wherein each utterance in the speech data receives a recognition confidence score;
   analyzing the speech data that is not annotated with one or more spoken language understanding models, wherein each utterance in the speech data receives an understanding confidence score; and
   creating an annotation list that includes at least a portion of the utterances having a recognition confidence score below a confidence threshold score and that includes at least a portion of the utterances having an understanding confidence score below an understanding threshold score.

7. A method as defined in claim 6, wherein analyzing speech data that is not annotated with one or more speech recognition models further comprises processing the speech data using one or more language models and one or more acoustic models.

8. A method as defined in claim 6, wherein analyzing the speech data that is not annotated with one or more spoken language understanding models further comprises processing speech data that has been recognized by the one or more speech recognition models.

9. A method as defined in claim 6, further comprising:
   generating a call type for a particular utterance, wherein the call type is included in an annotation guide and wherein the particular utterance has an existing call type; and
   including the particular utterance in the annotation list if the call type of the particular utterance does not match the existing call type of the particular utterance.

10. A method as defined in claim 6, wherein creating an annotation list further comprises identifying a type of annotation to be performed for each utterance included in the annotation list.

11. A method as defined in claim 10, wherein creating an annotation list further comprises selecting utterances to be included in the annotation list based on previously annotated speech data.

12. A method as defined in claim 10, wherein creating an annotation list further comprises selecting utterances to be included in the annotation list based on deficiencies of the one or more speech understanding models or on deficiencies of the one or more spoken language understanding models.

13. A method as defined in claim 10, wherein creating an annotation list further comprises establishing an order in which the utterances included in the annotation list are to be annotated.

14. A method as defined in claim 10, further comprising:
    searching the speech data for additional utterances that are similar to the utterances having a recognition confidence score below a confidence threshold score and that are similar to utterances having an understanding confidence score that is lower than an understanding threshold score; and
    including the additional utterances in the annotation list.

15. A computer program product having computer-executable instructions for performing the method of claim 6.

16. In a system that collects speech data for developing a dialog application, wherein the dialog application includes speech recognition models, spoken language understanding models, and labeling models, a method for reducing time required to annotate the speech data, the method comprising:
    selecting one or more utterances from speech data for annotation based on confidence scores of the one or more utterances, wherein the confidence scores are generated by at least one of: speech recognition models, spoken language understanding models, and labeling models;
    selecting one or more utterances from the speech data for annotation based on deficiencies of a dialog application; and
    creating an annotation list that includes the selected one or more utterances, wherein the annotation list identifies a type of annotation to be performed for each of the one or more utterances in the annotation list.

17. In a system that collects speech data for developing a dialog application, wherein the dialog application includes speech recognition models, spoken language understanding models, and labeling models, a method for reducing time required to annotate the speech data, the method comprising:
    selecting one or more utterances from speech data for annotation based on confidence scores of the one or more utterances, wherein the confidence scores are generated by at least one of: speech recognition models, spoken language understanding models, and labeling models, wherein selecting one or more utterances from speech data for annotation based on confidence scores further comprises:
        (1) generating a first call type for a particular utterance with the labeling models, wherein the particular utterance has an existing call type that was assigned by a labeler; and
        (2) including the particular utterance in the annotation list if the first call type does not match the existing call type; and
    creating an annotation list that includes the selected one or more utterances, wherein the annotation list identifies a type of annotation to be performed for each of the one or more utterances in the annotation list.

18. In a system that collects speech data for developing a dialog application, wherein the dialog application includes speech recognition models, spoken language understanding models, and labeling models, a method for reducing time required to annotate the speech data, the method comprising:
    selecting one or more utterances from speech data for annotation based on confidence scores of the one or more utterances, wherein the confidence scores are generated by at least one of: speech recognition models, spoken language understanding models, and labeling models; and
    creating an annotation list that includes the selected one or more utterances, wherein the annotation list identifies a type of annotation to be performed for each of the one or more utterances in the annotation list and wherein creating an annotation list further comprises identifying an order in which the selected one or more utterances are to be annotated.

19. In a system that collects speech data for use in developing a dialog application, a method for reducing the time required to annotate the speech data, the method comprising:
    evaluating an utterance that is not annotated with a speech recognizer using a criterion, wherein the criterion is a confidence score,
    creating an annotation list that includes the utterance if a confidence score of the utterance is below a threshold confidence score and wherein the criterion represents how well the speech recognition model recognized the utterance; and
    creating an annotation list that includes the utterance if the utterance did not satisfy the criterion.

20. In a system that collects speech data for use in developing a dialog application, a method for reducing the time required to annotate the speech data, the method comprising:
    evaluating an utterance that is not annotated with a speech recognizer using a criterion, wherein the criterion represents how well the speech recognition model recognized the utterance, wherein evaluating an utterance that is not annotated with a speech recognizer using a criterion further comprises:
        (1) evaluating a dialog context the utterance; and
        (2) evaluating at least one feature of the utterance; and
    creating an annotation list that includes the utterance if the utterance did not satisfy the criterion.

21. In a system that collects speech data for use in developing a dialog application, a method for reducing the time required to annotate the speech data, the method comprising:
    evaluating an utterance that is not annotated with a spoken language understanding model using a criterion, wherein the criterion represents how well the spoken language understanding model understood the utterance, wherein evaluating an utterance that is not annotated with a spoken language understanding model using a criterion further comprises:
        (1) evaluating a dialog context of the utterance; and
        (2) evaluating a feature of the utterance; and
    including the utterance in an annotation list if the utterance did not satisfy the criterion, wherein the annotation list identifies the utterance and a type of annotation to be performed for the utterance.

* * * * *